(12) United States Patent
Hagg et al.

(10) Patent No.: US 8,540,811 B2
(45) Date of Patent: Sep. 24, 2013

(54) SCRUBBER

(75) Inventors: Ulf Hagg, Molnlycke (SE); Lennart Gustafsson, Stenkullen (SE)

(73) Assignee: Gotaverken Miljo AB, Goteborg (SE)

( * ) Notice: Subject to any disclaimer, the term of this patent is extended or adjusted under 35 U.S.C. 154(b) by 887 days.

(21) Appl. No.: 10/586,392

(22) PCT Filed: Feb. 16, 2005

(86) PCT No.: PCT/SE2005/000207
§ 371 (c)(1),
(2), (4) Date: Jul. 17, 2006

(87) PCT Pub. No.: WO2005/079955
PCT Pub. Date: Sep. 1, 2005

(65) Prior Publication Data
US 2007/0113737 A1 May 24, 2007

(30) Foreign Application Priority Data

Feb. 20, 2004 (SE) ........................................ 0400397

(51) Int. Cl.
*B01D 47/14* (2006.01)
(52) U.S. Cl.
USPC ................... 96/262; 95/199; 95/213; 95/223; 96/265; 96/290

(58) Field of Classification Search
USPC ..................... 95/199, 223, 210, 213; 96/290, 96/296, 262, 265; 261/114.5, 114.1, 114.2
See application file for complete search history.

(56) References Cited

U.S. PATENT DOCUMENTS 3,528,220 A * 9/1970 Rice et al. ........................ 95/198
6,306,357 B1 * 10/2001 Simonson et al. ............. 423/232
6,399,030 B1 * 6/2002 Nolan ............................. 422/172

FOREIGN PATENT DOCUMENTS
GB 2 232 365 12/1990

* cited by examiner

*Primary Examiner* — Duane Smith
(74) *Attorney, Agent, or Firm* — Young & Thompson

(57) ABSTRACT

A scrubber for the cleaning of gases containing several scrubber stages (1-4), where the scrubber stages are arranged in a scrubber tower with the different stages at different levels above each other in the scrubber tower. At least one of the scrubber stages (2-4) above the lowest scrubber stage (1) comprises, according to the invention, a ring-shaped tank (10, 15, 20) arranged inside the scrubber tower, which ring shaped tank (10, 15, 20) is arranged surrounding a central channel (9, 14, 19) through which the gas that is to be cleaned can pass upwards.

10 Claims, 3 Drawing Sheets

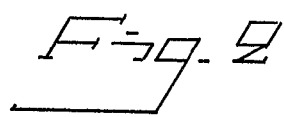
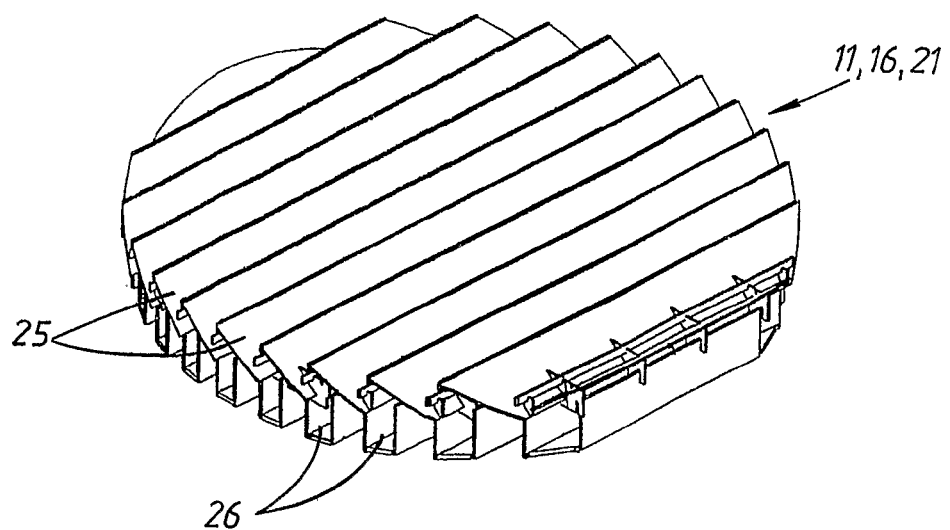
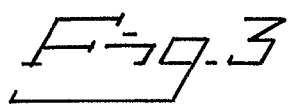
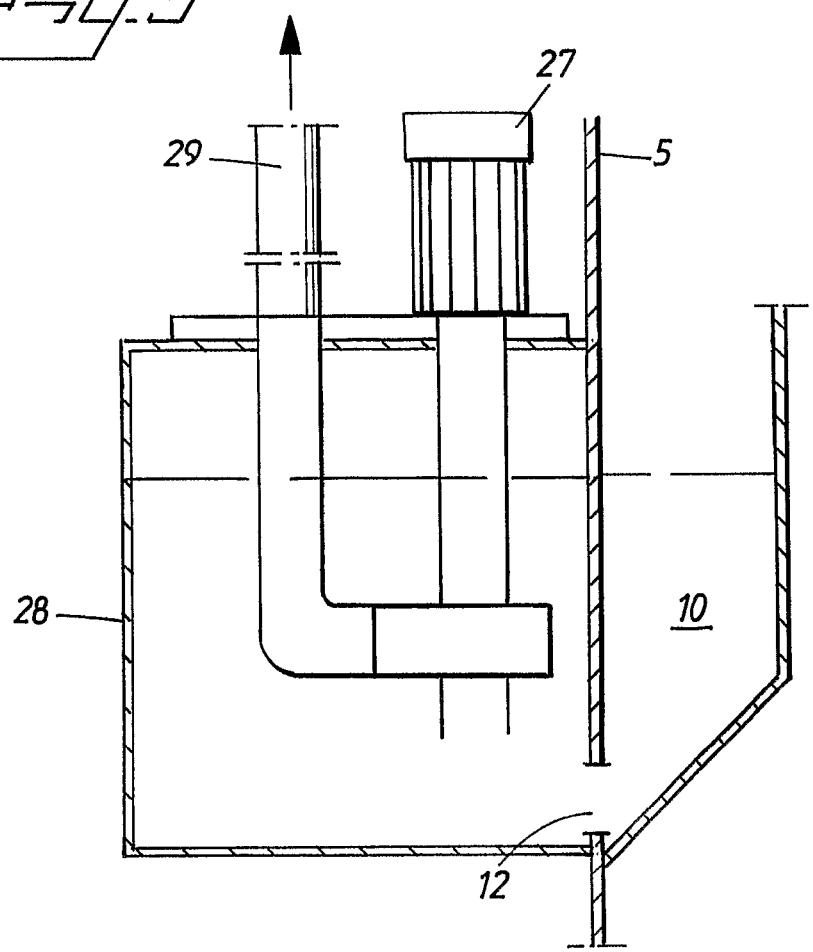

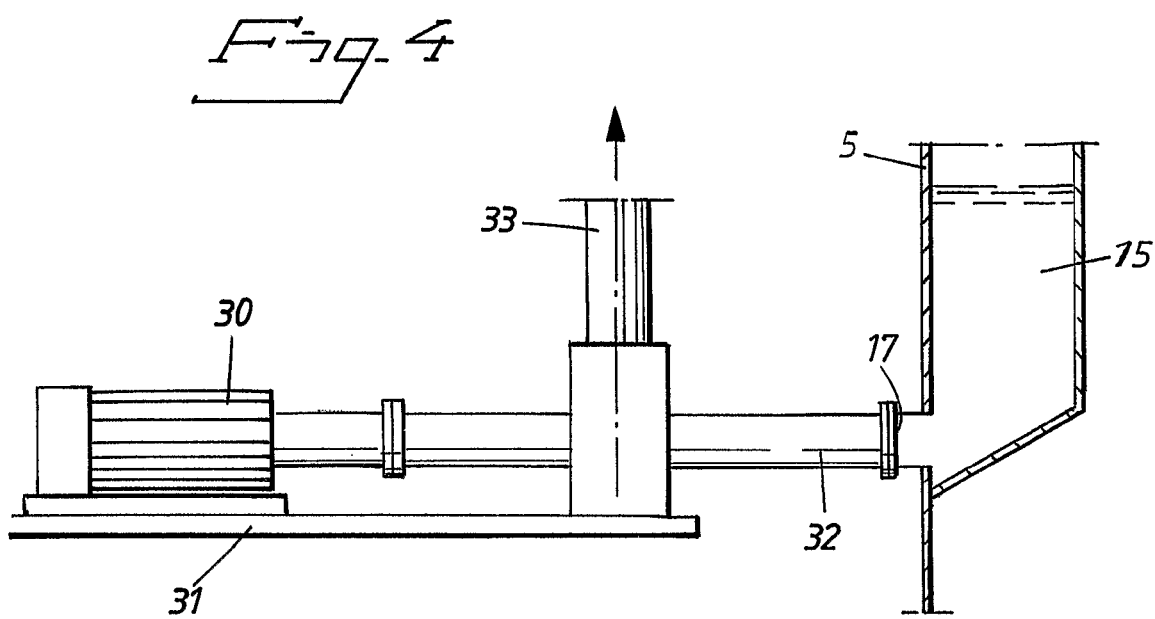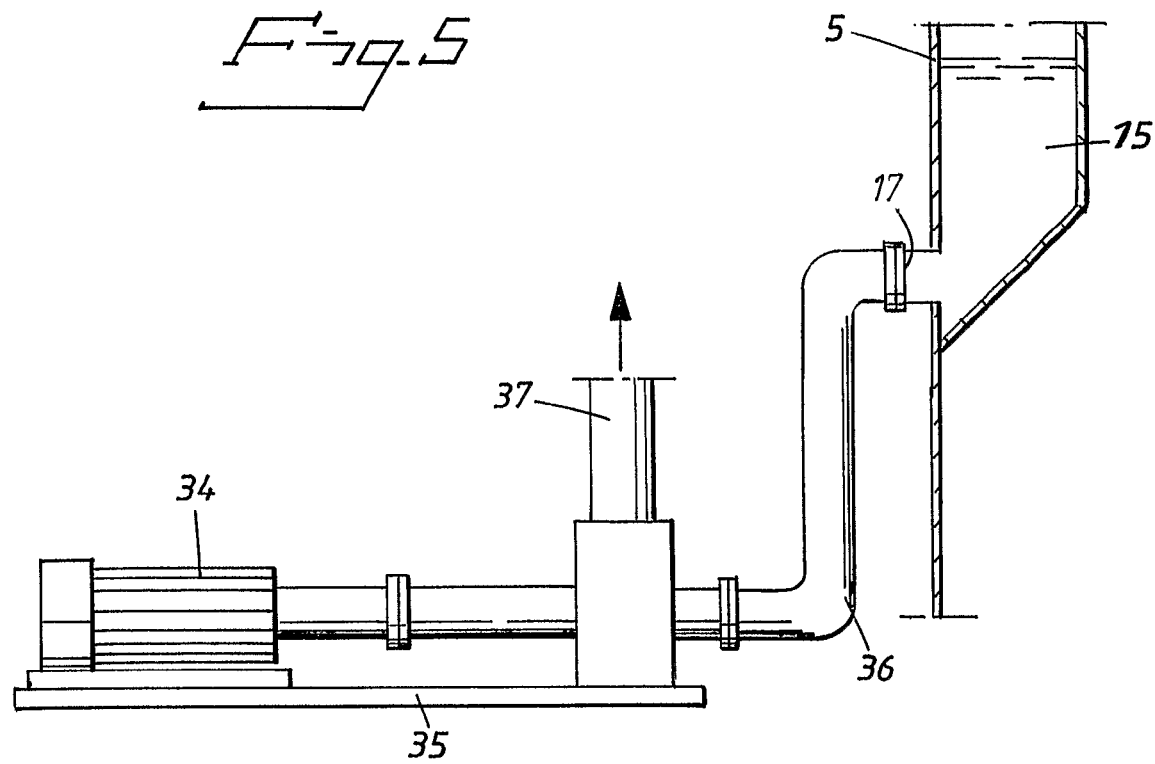

SCRUBBER

BACKGROUND OF THE INVENTION

1. Field of the Invention

The present invention relates to a scrubber for cleaning gases, in particular to a scrubber in the form of a tower containing several scrubbing stages.

2. Description of the Related Art

Scrubbers are common in the context of cleaning gases, and they are used for, among other applications, cleaning exhaust gases, fumes and other process gases in, for example, the chemical industry. The scrubber is used to clean the gases from contaminants that should not be released into the atmosphere.

A scrubber is normally designed as a vertical cylinder, in which a process fluid circulates, normally in a counterflow direction to the gas that is to be cleaned. The process fluid, such as water with or without additives, is pumped around and injected into the scrubber through a nozzle system in the upper part of the scrubber. The gas that is to be cleaned is introduced at the bottom of the scrubber, and is subsequently allowed to rise, in order to leave the scrubber at its top. The process fluid and the gas are in this way brought into contact with each other, whereby certain components that are present in the gas, such as, for example, HCl, $SO_2$, and HF, are absorbed in the process fluid. The gas is in this way cleaned from contaminants.

In order to improve the contact between the process fluid and the gas that is to be cleaned, what is known as column packing may be installed in the scrubber. The column packing may be manufactured from plastic or a metallic or ceramic material, and it may be designed with various geometrical forms in order to offer a greater or lesser contact area between the gas and the fluid.

A scrubber can, as has been mentioned above, be built in several individual stages, where each stage has its own pump circulation circuit and its own nozzle system. The stages are in this case separated by special separation layers that collect the process fluid and lead it onwards to a pump tank from which process fluid can, in turn, be led onwards to the pump circulation system. The pump tank must be able to accommodate a volume of fluid that is sufficiently large such that it can offer satisfactory function of the pump system during normal operation, and, most importantly, during start-up and shut-down sequences when all fluid is to be collected in the tank.

In a scrubber that has only one stage, the lower part of the scrubber, the bottom part, acts as pump tank. In scrubber systems with two or more stages, a separate tank volume is required for each stage of the scrubber, such that the fluids from the various stages are not mixed with each other. The traditional manner of constructing this has been to have an external tank located at a lower level than the scrubber stage.

With scrubber systems having several stages and with the scrubbers placed in a tower, the solutions described above with the tanks lead to extensive pipe-laying, for both the supply and withdrawal lines for each scrubber. Since towers with several scrubber stages can be very high, severe demands are placed on the pumps that are to circulate the process fluid, such that they can pump fluid to the height that is required for large volumes. Furthermore, the fluid content of the pipes becomes very large, and the tanks must be dimensioned such that they can accommodate all the fluid when the flow is stopped for one reason or another.

It is therefore a purpose of the present invention to achieve a scrubber, in particular a scrubber tower with several scrubber stages, in which the problems described above with the laying of pipes and tanks can be solved in a more efficient manner.

SUMMARY OF THE INVENTION

The purpose of the invention described above is achieved with a scrubber containing several scrubber stages, where the scrubber stages are arranged in a scrubber tower with the different stages at different levels over each other in the scrubber tower, and where, according to the invention, at least one of the scrubber stages above the lowest stage comprises a ring-shaped tank arranged inside the scrubber tower, which ring-shaped tank is arranged surrounding a central channel through which the gas that is to be cleaned can rise.

It is appropriate that all scrubber stages above the first stage are provided with such ring-shaped tanks.

BRIEF DESCRIPTION OF THE DRAWINGS

The invention will now be described in more detail in the form of a non-limiting embodiment, shown in the attached drawings, where FIG. 2 shows a schematic perspective view of a flow-collection trough to be used between the different stages in a scrubber tower, FIG. 3 shows schematically the location of a circulation pump according to a first design, FIG. 4 shows schematically the location of a circulation pump according to a second design, and FIG. 5 shows schematically the location of a circulation pump according to a third design.

DETAILED DESCRIPTION

Figure 1:
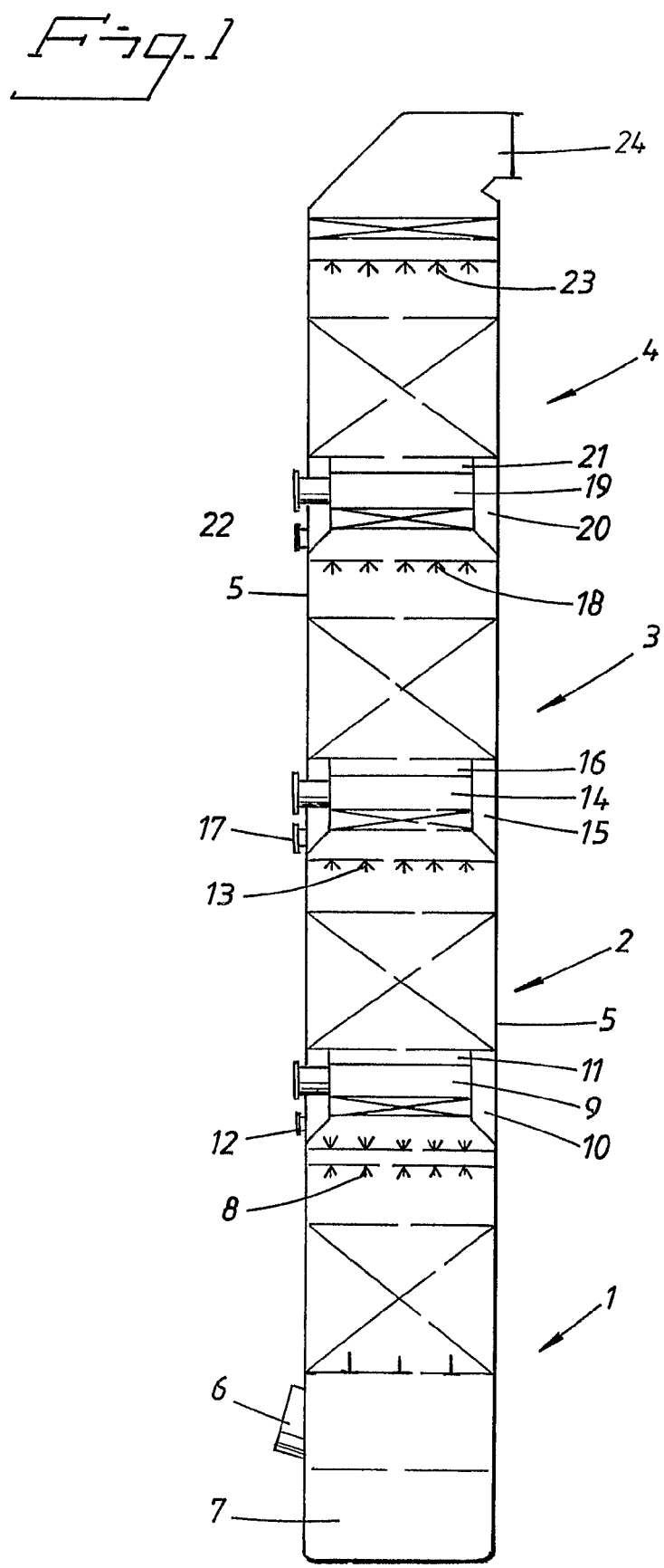
FIG. 1 shows a sketch of the principle of how a scrubber tower according to the invention may be designed.

Thus, FIG. 1 shows schematically a scrubber tower, comprising four scrubber stages 1, 2, 3 and 4. The scrubber tower is surrounded by a cylindrical outer cover 5, and demonstrates at the bottom an inlet 6 for the gas that is to be cleaned. In the lowest scrubber stage 1 a collection tank 7 is formed inside the tower for the fluid that is used for cleaning the incoming gas in the lowest scrubber stage 1. This fluid can, with the aid of pipes and a circulation pump not shown in the drawing, be fed from the collection tank up to nozzle beams 8 in the upper part of the scrubber stage 1, and there sprayed out to meet the upward flowing gas.

A narrowed section is located inside the scrubber tower 1 above the lowest scrubber stage, as is shown in the drawing, forming a channel 9 in the centre of the tower in order to allow the gas to flow onwards and upwards to the next scrubber stage 2. A ring-shaped space is formed between the channel 9 and the outer surface 5 of the tower in which a ring-shaped tank 10 can be located, for the reception of scrubber fluid from the second scrubber stage. A separation trough 11, shown in detail in FIG. 2, is arranged uppermost in the channel 9, with which scrubber fluid arriving from above can be collected and led out to the ring-shaped tank 10 that surrounds the separation trough 11. Gas that arrives from below through the channel 9 from the scrubber stage 1 can, however, pass through the separation trough 11 and continue its upwards flow. A connection 12 from the ring-shaped tank 10 is also arranged, to which a circulation pump and a pipe, not shown in the drawing, can be connected in order to pump the fluid that has been collected in the ring-shaped tank 10 up to nozzle beams 13 arranged in the upper part of the second scrubber stage 2, there to be sprayed out and to meet the gas flowing upwards in the second scrubber stage 2.

The third and the fourth stages 3 and 4 of the scrubber are, in an equivalent manner, designed with narrower sections inside the scrubber tower, forming channels 14 and 19 in the centre of the tower in order to allow the gas to flow onwards and upwards to the next stages 3 and 4 of the scrubber. Ring-shaped spaces are formed between the channels 14 and 19 and the outer surface 5 of the tower in which further ring-shaped tanks 15 and 20 can be located, for the reception of scrubber fluid from the third and fourth stages of the scrubber. Separation troughs 16 and 21 are arranged uppermost in the channels 14 and 19, with which scrubber fluid coming from above can be collected and led out to the ring-shaped tanks 15 and 20 that surround the separation troughs 16 and 21. Gas that arrives from underneath through the channels 14 and 19 from the scrubber stages 2 and 3 can, however, pass through the separation troughs 16 and 21 and continue on its upward flow. Connections 17 and 22 are also arranged from the ring-shaped tanks 15 and 20, to each of which a circulation pump and a pipe, see FIGS. 3-5, can be connected to pump the fluid that has been collected in the ring-shaped tanks 15 and 20 up to spray beams 18 and 23 arranged in the upper part of the third stage 3 of the scrubber and the fourth stage 4 of the scrubber, there to be sprayed out and meet the upwards flowing gas in these third and fourth scrubber stages 3, 4.

The scrubber tower is terminated above the fourth scrubber stage 4 with an outlet 24 for the gas that has been cleaned in the scrubber tower.

It is clear that the scrubber tower can comprise fewer than or more than the four scrubber stages that have been shown in the present embodiment. It should also be pointed out that only those parts of the scrubber tower that are of significance for the invention have been shown on the drawings and explained in this text.

FIG. 2 shows, as has been described above, a separation trough 11, 16, 21 used in the scrubber according to the invention. Such separation troughs 11, 16, 21, are thus used between the different stages of the scrubber to separate scrubber fluid and lead it to the relevant tank 10, 15, 20 for recirculation. The separation troughs comprise a number of obliquely placed laminae 25, along which the fluid can run down into trough channels 26. Each lamina 25 is provided with an associated trough channel 26. The trough channels 26 are open at both ends, and extend somewhat more than the complete diameter of the channels 9, 14, 19, such that fluid that has entered the trough channels 26 can be led out to the relevant tank 10, 15, 20. A space is formed between each pair of laminae 25 and each trough channel through which gas can pass upwards from underneath. This space, however, is covered by the neighbouring lamina, such that no fluid, or essentially no fluid, from above can pass downwards through the separation trough 11, 16, 21.

FIG. 3 shows a first embodiment of a method of arranging a circulation pump 27 at, for example, the tank 10 in order to circulate the scrubber fluid that has been collected in the tank 10 back to the spray beams 13. A pump tank 28 is connected outside of the outer surface 5 of the scrubber tower in this embodiment, which pump tank is connected directly to the tank 10 inside of the outer cover through the connection 12. The circulation pump 27 can be any suitable pump that can feed sufficient quantities of scrubber fluid through a feed pipe 29 up to the spray beams 13.

According to one preferred embodiment, the feed pipe 29 is located inside of the outer cover 5 of the scrubber tower.

By arranging, as is shown in FIG. 3, a separate pump tank 28 outside of the outer cover 5, and with the circulation pump 27 also arranged outside of the outer cover 5, these parts are made easy to access for service and maintenance, while the length of the feed pipe 29 can be limited to the height of the relevant scrubber stage, stage 2 in the example illustrated. It is clear that such a location of the circulation pump and the pump tank is possible for any of the scrubber stages in a scrubber tower, and it is obvious that the length of the feed pipe can be limited to the height of the relevant scrubber stage in this manner. The circulation pump may also have a lower feed capacity than that required if the pump is always placed on the ground.

FIG. 4 shows a second embodiment of the manner in which a circulation pump 30 can be arranged at, for example, the tank 15 in order to recirculate the scrubber fluid that has been collected in the tank 15 to the spray beams 18. In this embodiment, a carrier 31, such as a floor mounted on a frame, for example, is arranged outside of the outer cover 5 of the scrubber tower, which carrier supports the circulation pump 30 at the same height as the tank 15. The circulation pump 30 is connected through an inlet pipe 32 and the connection 17 to the tank 15 inside the outer cover. The circulation pump 30 can be any suitable pump that can feed sufficient quantities of scrubber fluid through a feed pipe 33 up to the spray beams 18.

By arranging the circulation pump 30 supported outside of the outer cover 5, as is shown in FIG. 4, connected to the tank 15 inside of the outer cover, the pump is made easy to access for service and maintenance, while the length of the feed pipe 33 can be limited to the height of the relevant scrubber stage, stage 3 in the example illustrated. It is clear that such a location of the circulation pump is possible for any of the scrubber stages in a scrubber tower, and it is obvious that the length of the feed pipe can be limited to the height of the relevant scrubber stage in this manner. The circulation pump may also have a lower feed capacity than that required if the pump is always placed on the ground.

FIG. 5 shows a third embodiment of the manner in which a circulation pump 34 can be arranged, for example, in connection with the tank 15 in order to recirculate the scrubber fluid that has been collected in the tank 15 to the spray beams 18. In this design, a carrier 35, such as a floor mounted on a frame, for example, is arranged outside of the outer cover 5 of the scrubber tower, which carrier supports the circulation pump 34 at ground level. The circulation pump 34 is connected through an inlet pipe 36 and the connection 17 to the tank 15 inside the outer cover. The circulation pump 34 can be any suitable pump that can feed sufficient quantities of scrubber fluid through a feed pipe 37 up to the spray beams 18.

According to one preferred embodiment, the feed pipe 37 is located inside the outer cover 5 of the scrubber tower. This can also be the case for the inlet pipe 36.

The design according to FIG. 5 provides ready access to the circulation pump 34 for service and maintenance, but it naturally leads to the laying of longer pipes than the first two embodiments.

The scrubber designs according to the present invention can be used for all types of scrubber that comprise two or more stages arranged above each other, independently of the field of application of the scrubber.

The scrubber according to the invention can comprise in known manner column packing of the type that has been described in the introduction, in order to offer a larger or smaller contact area between the gas and the fluid.

The pipes and the feed pipes that have been shown on the drawings as having been laid outside of the outer surface 5 of the scrubber can advantageously be laid inside of this cover, in order to avoid the risk of freezing during a long period of non-operation, and to make possible factory assembly.

What is claimed is:

1. A scrubber for the cleaning of gases, comprising:

a plurality of scrubber stages (1-4) arranged in a scrubber tower with different ones of the plurality of scrubber stages at different levels above each other in the scrubber tower, including a lowest scrubber stage (1) and upper scrubber stages (2, 3, 4) all located above the lowest scrubber stage (1), each of the upper scrubber stages (2, 3, 4) comprising a ring-shaped tank (10, 15, 20) arranged inside the scrubber tower, each ring-shaped tank (10, 15, 20) arranged surrounding a central channel (9, 14, 19) through which a gas to be cleaned can pass upwards, each scrubber stage (1, 2, 3, 4) of the scrubber having a circulation pump (27, 30, 34) arranged to feed, through feed pipes (29, 33, 37), scrubber fluid from a tank (7, 10, 15, 20) at a bottom of a respective one of the scrubber stages (1, 2, 3, 4) to spray beams (8, 13, 18, 23) arranged at an upper part of the respective one of the scrubber stages (1, 2, 3, 4) for distribution over a cross-section of the respective one of the scrubber stages (1, 2, 3, 4) in a direction against an upwards flowing gas, and a bottom of each of the upper scrubber stages (2, 3, 4) further comprising a separation trough (11, 16, 21), located above a corresponding ring-shaped tank (10, 15, 20) of the upper scrubber stages (2, 3, 4), that separates the scrubber fluid from the upwards flowing gas, each said separation trough (11, 16, 21) comprising obliquely placed laminae (25) for leading scrubber fluid that arrives from above to trough channels (26) arranged under the laminae (25), said trough channels (26) having open ends configured so that the scrubber fluid is led directly to the corresponding ring-shaped tank (10, 15, 20) located underneath the separation trough (11, 16, 21).

2. The scrubber according to claim 1, wherein each circulation pump is connected to a respective ring-shaped tank and located at essentially a same level as the respective ring-shaped tank.

3. The scrubber according to claim 2, wherein the circulation pump is arranged outside of the respective ring-shaped tank and outside of the scrubber tower, and connected by means of an inlet pipe to a connection on the respective ring-shaped tank.

4. The scrubber according to claim 2, wherein a pump tank (28) is arranged outside of at least one of the ring-shaped tanks and outside of the scrubber tower directly connected to the at least one of the ring-shaped tank tanks through a connection, and wherein the circulation pump arranged to feed the scrubber fluid from the at least one of the ring-shaped tanks is arranged in or connected to the pump tank (28).

5. The scrubber according to claim 1, wherein the circulation pumps arranged to feed the scrubber fluid from at least one of the ring-shaped tanks is arranged on the ground outside of the at least one of the ring-shaped tanks and outside of the scrubber tower, and connected by means of an inlet pipe (36) to a connector (17) on the at least one of the ring-shaped tanks.

6. The scrubber according to claim 1, wherein the feed pipes for feeding the scrubber fluid to the spray beams is located inside an outer surface (5) of the scrubber tower.

7. The scrubber according to claim 2, wherein the feed pipes for feeding the scrubber fluid to the spray beams is located inside an outer surface (5) of the scrubber tower.

8. The scrubber according to claim 3, wherein the feed pipes for feeding the scrubber fluid to the spray beams is located inside an outer surface (5) of the scrubber tower.

9. The scrubber according to claim 4, wherein the feed pipes for feeding the scrubber fluid to the spray beams is located inside an outer surface (5) of the scrubber tower.

10. The scrubber according to claim 5, wherein the feed pipes for feeding the scrubber fluid to the spray beams is located inside an outer surface (5) of the scrubber tower.

* * * * *

UNITED STATES PATENT AND TRADEMARK OFFICE
CERTIFICATE OF CORRECTION

PATENT NO. : 8,540,811 B2  Page 1 of 1
APPLICATION NO. : 10/586392
DATED : September 24, 2013
INVENTOR(S) : Hagg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 935 days.

Signed and Sealed this
Fifteenth Day of September, 2015

Michelle K. Lee
*Director of the United States Patent and Trademark Office*